United States Patent [19]
Yamada et al.

[11] 4,425,270
[45] Jan. 10, 1984

[54] REACTIVE DISAZO COMPOUNDS

[75] Inventors: Yasushi Yamada, Ohmiya; Kenji Kunikata, Yono; Hideo Otake, Ohmiya, all of Japan

[73] Assignee: Nippon Kayaku Kabushiki Kaisha, Tokyo, Japan

[21] Appl. No.: 250,431

[22] Filed: Apr. 2, 1981

[51] Int. Cl.³ .................. C09B 62/09; C09B 62/03
[52] U.S. Cl. .................................... 260/153; 260/154
[58] Field of Search ............................... 260/153, 154

[56] References Cited
U.S. PATENT DOCUMENTS

| | | | |
|---|---|---|---|
| 2,860,128 | 11/1958 | Gunst | 260/153 |
| 3,190,872 | 6/1965 | Oesterlein et al. | 260/153 |
| 3,711,460 | 1/1973 | Schündehütte | 260/153 X |
| 3,950,128 | 4/1976 | Gregory | 260/153 X |
| 4,083,840 | 4/1978 | Schoefberger | 260/153 |
| 4,145,340 | 3/1979 | Ridyard | 260/153 |
| 4,329,282 | 5/1982 | Henk | 260/153 |

*Primary Examiner*—Thomas A. Waltz
*Attorney, Agent, or Firm*—Henry C. Nields

[57] ABSTRACT

A reactive disazo compound which, in the free acid form, is represented by the formula:

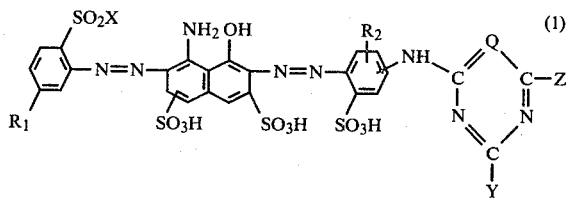

wherein $R_1$ is H, Cl or $SO_3H$, $R_2$ is H, $CH_3$ or $SO_3H$, X is β-sulfatoethyl, β-thiosulfatoethyl, β-phosphatoethyl or vinyl, Y is Cl or F, Z is Cl, F or $Z_1$, $Z_1$ is amino; mono- or dialkylamino having 1 to 4 carbon atoms which may be substituted by hydroxy, carboxy or sulfo; morpholino; anilino which may be substituted by halogen, lower alkyl, lower alkoxy, carboxy or sulfo; N-methylanilino, naphthylamino or sulfo-substituted naphthylamino; alkoxy having 1 to 4 carbon atoms which may be substituted by lower alkoxy; phenoxy; alkylthio having 1 to 4 carbon atoms which may be substituted by hydroxy; phenylthio, and Q is N, C—Cl or C—F when Z is Cl or F and N when Z is $Z_1$. These compounds are used for dyeing or printing cellulosic fibers.

8 Claims, No Drawings

REACTIVE DISAZO COMPOUNDS

DETAILED DESCRIPTION OF THE INVENTION

The present invention relates to reactive disazo compounds represented by the formula in the free acid form:

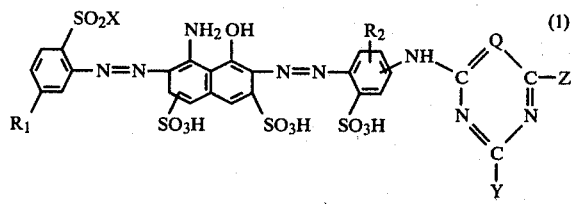

wherein $R_1$ is H, Cl or $SO_3H$, $R_2$ is H, $CH_3$ or $SO_3H$, X is β-sulfatoethyl, β-thiosulfatoethyl, β-phosphatoethyl or vinyl, Y is Cl or F, Z is Cl, F or $Z_1$, $Z_1$ is amino; mono- or dialkylamino having 1 to 4 carbon atoms which may be substituted by hydroxy, carboxy or sulfo; morpholino; anilino which may be substituted by halogen, lower alkyl, lower alkoxy, carboxy or sulfo; N-methylanilino, naphthylamino or sulfo-substituted naphthylamino; alkoxy having 1 to 4 carbon atoms which may be substituted by lower alkoxy; phenoxy; alkylthio having 1 to 4 carbon atoms which may be substituted by hydroxy; phenylthio, and Q is N, C—Cl or C—F when Z is Cl or F and N when Z is $Z_1$, and to the method of dyeing by the use of such compound.

The compounds of the present invention exist in the form of a free acid or its salt, preferably alkaline metallic salt or alkaline-earth metallic salt, and the most preferred salts are sodium salt, potassium salt and calcium salt.

Various methods can be employed for the synthesis of reactive disazo compounds represented by formula (1), but the following three are most advantageous among others.

According to the first process, an aromatic amine of formula:

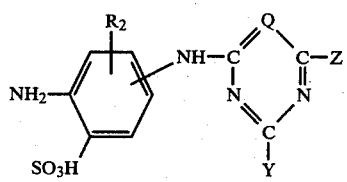

wherein $R_2$, Y, Z and Q are the same as defined above, is diazotized, preferably in an aqueous medium, and then coupled with a compound of the formula:

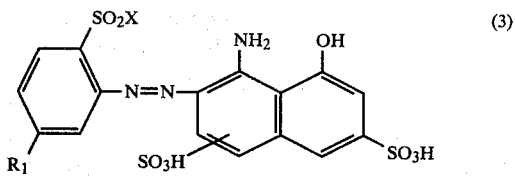

wherein $R_1$ and X are the same as defined above, preferably in an aqueous medium at pH 6–7.

The compound of formula (3) is obtained by diazotizing a compound of the formula:

wherein $R_1$ and X are the same as defined above, in the usual manner in an aqueous medium and coupling the resulting product with 1-amino-8-naphthol-disulfonic acid under an acidic condition.

According to the second process, an aromatic amine of formula:

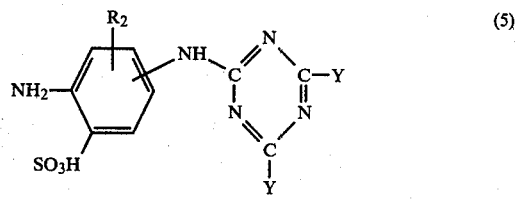

wherein $R_2$ and Y are the same as defined above, is diazotized, preferably in an aqueous medium, followed by coupling with a compound of formula (3), preferably in an aqueous medium at pH 6–7 and then condensed with a compound of formula:

$$HZ \quad (6)$$

wherein Z is the same as defined above, preferably at 10° to 60° C. keeping pH at 4–7 in the presence of an acid binding agent such as sodium carbonate or sodium bicarbonate, to obtain a reactive disazo compound of formula (1) wherein Q is N.

According to the third process, a compound of formula:

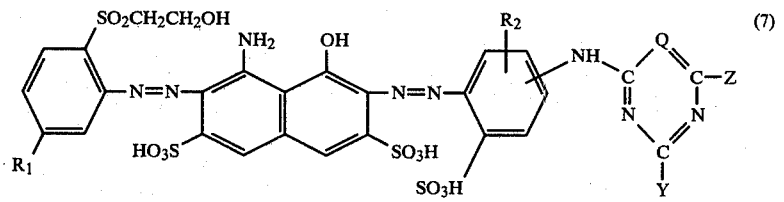

wherein $R_1$, $R_2$, Y and Z are as defined above, X is β-sulfatoethyl, β-phosphatoethyl or vinyl, is esterified with an esterifying agent to obtain a compound of formula (1). The esterification is effected preferably at room temperature to 30° C. Examples of the esterifying agents include concentrated sulfuric acid, dilute oleum, chlorosulfonic acid, phosphoric acid, phosphoric anhydride and sulphamic acid. Sulphamic acid is used in an organic solvent such as pyridine and D.M.F. but other agents do not need to use any solvent.

The compound of formula (1) wherein X is vinyl is byproduced when the compound of formula (1) wherein X is β-sulfatoethyl or β-phosfatoethyl.

As examples of the compound of formula (4) there may be mentioned aniline-2-β-sulfatoethylsulfone, 5-chloroaniline-2-β-sulfatoethylsulfone, 5-sulfoaniline-2-β-sulfatoethylsulfone, and corresponding thereto β-thiosulfatoethylsulfon, β-phosphatoethylsulfone and vinylsulfone.

The coupling components of formula (3) include 1-amino-8-naphthol-3,6-disulfonic acid and 1-amino-8-naphthol-4,6-disulfonic acid.

The phenylenediaminesulfonic acid which is a starting material of the compound of formula (5) includes 1,3-diaminobenzene-4-sulfonic acid, 1,3-diamino-4-methylbenzene-6-sulfonic acid, 1,4-diaminobenzene-3-sulfonic acid, 1,3-diaminobenzene-4,6-disulfonic acid and 1,4-diaminobenzene-3,6-disulfonic acid.

Examples of Z are halogen atoms such as chlorine and fluorine or $Z_1$, and as examples of $Z_1$ there may be mentioned —$NH_2$, mono- or dialkylamino having 1 to 4 carbon atoms which may be substituted by hydroxy, carboxy or sulfo (for example, —$NHCH_3$, —$NHCH_2CH_3$, —$NHCH_2CH_2CH_3$,

—$NHCH_2CH_2CH_2CH_3$, —$NHCH_2CH_2OH$, —$NHCH_2CH_2SO_3H$,

—$NHCH_2COOH$, —$NHCH_2CH_2COOH$, —N(CH$_3$)(CH$_3$),

—N(CH$_2$CH$_3$)(CH$_2$CH$_3$), —N(CH$_2$CH$_2$OH)(CH$_2$CH$_2$OH) ) morpholino; anilino, N—methylanilino, naphthyl amino or sulfo substituted naphthyl amino (for example,

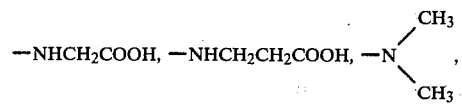 (o, m, p),

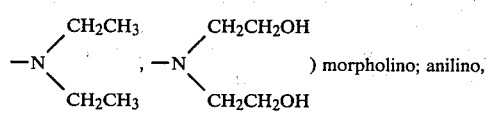 (3,4; 3,5; 2,5; 2,4),

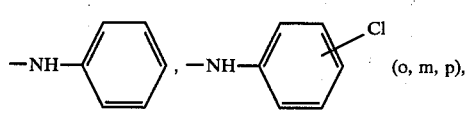 (o, m, p),

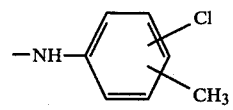 (3,4; 2,4; 2,5; 2,3; 2,6; 3,5),

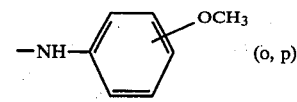 (3-Cl, 4-CH$_3$; 4-Cl, 2-CH$_3$; 5-Cl, 2-CH$_3$; 3-Cl, 2-CH$_3$),

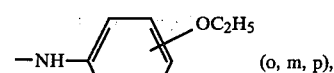 (o, p),

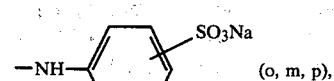 (o, m, p),

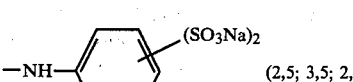 (o, m, p),

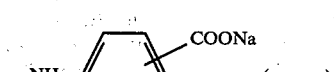 (2,5; 3,5; 2,4),

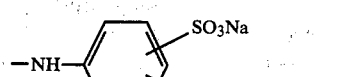 (o, m, p),

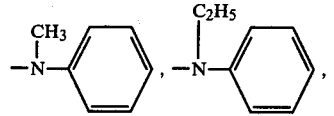 (2-COONa,4-SO$_3$Na; 2-COONa,5-SO$_3$Na),

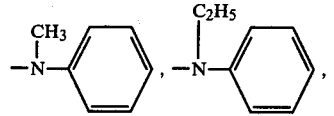 (2-CH$_3$,5-SO$_3$Na; 4-CH$_3$,3-SO$_3$Na; 2-CH$_3$,4-SO$_3$Na; 2-CH$_3$, 4,6-SO$_3$Na; 4-CH$_3$,3-SO$_3$Na),

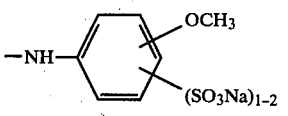,

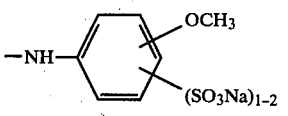 (4-OCH$_3$,2-SO$_3$Na; 2-OCH$_3$,5-SO$_3$Na; 4-OCH$_3$, 2,5-SO$_3$Na),

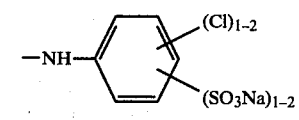 (2-Cl,5-SO$_3$Na; 4-Cl,3-SO$_3$Na; 2,5-Cl, 4-SO$_3$Na),

-continued

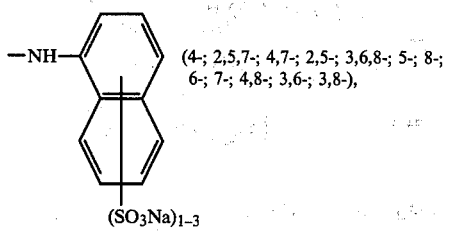

(4-; 2,5,7-; 4,7-; 2,5-; 3,6,8-; 5-; 8-;
6-; 7-; 4,8-; 3,6-; 3,8-),

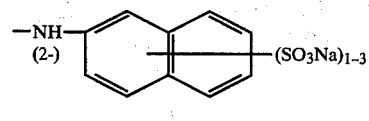

(4-; 6-; 4,8-; 1,5-; 3,6,8-; 6,8-; 3,6-; 1-;)

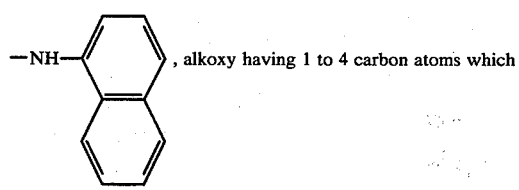, alkoxy having 1 to 4 carbon atoms which may be substituted by lower alkoxy (for example, —OCH₃,

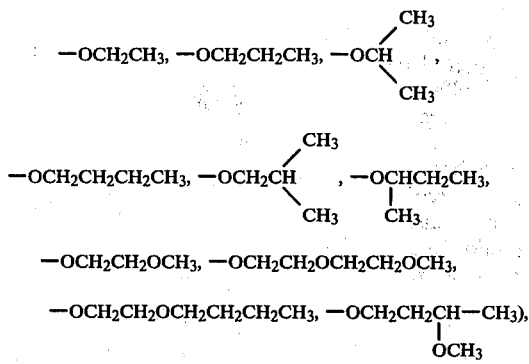

phenoxy, alkylthio having 1 to 4 carbon atoms which may be substituted by hydroxy (for example, —SCH₃, —SCH₂CH₃, —S.CH₂CH₂—CH₂CH₃, —SCH₂C-H₂OH) and phenylthio.

In the formula:

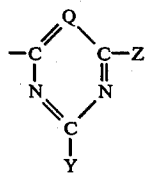 (8)

wherein Z is halogen and Q is carbon substituted for halogen, there are two examples as follows: 2,5,6-trichloropyrimidin-4-yl, 2,6-difluoro-5-chloropyrimidin-4-yl.

The new reactive azo compounds of the present invention can dye both natural and artificial fibers such as wool, silk, polyamide, cotton, viscose, rayon and regenerated cellulosic fibers, and they are especially suitable for dyeing or printing cellulosic fibers.

Cellulosic fibers to which the dyeing method of the present invention is applicable include cotton, linen, viscose rayon, viscose staple fiber, Bemberg, etc. and their mixed spun, woven or knitted products.

Usual dyeing methods such as dip-dyeing, printing and padding are widely used for dyeing by the present invention.

Acid binding agents used for dyeing include, for example, sodium bicarbonate, sodium metaphosphate, trisodium phosphate, sodium ortho- or metasilicate, sodium carbonate and sodium hydroxide.

The compounds of formula (1) may be used alone for dyeing but they are usually used in the form of a composition comprising 20-80 parts of the compound of formula (1) and 80-20 parts of builders such as Glauber's salt, NaCl, urea, phosphorate and a dust-inhibitor.

When the dyeing method of the present invention is effected using a relatively long liquor-to-goods ratio e.g. a batch dip-dyeing method, the dyebath is usually prepared with an inorganic salt such as sodium chloride or sodium sulfate and the dyestuff. Heated at 20°-100° C., dyeing is conducted for 10-60 minutes at first, followed by addition of acid binding agent and then dyeing is conducted again at 30°-100° C. for 20-60 minutes. Alternatively, the acid binding agent may be put in the dyebath at the start. After dyeing in neutral, another bath consisting of acid binding agent and inorganic salt may also be used to fix the dyestuff.

When the dyeing method of the present invention is effected using a relatively short liquor-to-goods ratio such as a continuous or semicontinuous dyeing, a dye bath is usually prepared which includes the dyestuff, acid binding agent, penetrant and, if necessary, urea together. After immersing in the dye bath for a short time, the fibers are squeezed and allowed to stand at room or at an elevated temperature, or otherwise are treated by steam or dry heating for a short time.

As the case may be, the fibers are immersed in a solution of the acid-binding agent beforehand and then padded in a neutral bath, or the fibers padded in a neutral dye bath may be treated with a solution of the acid binding agent saturated with an inorganic salt and then allowed to stand at room temperature or heat treated.

When the compound of the present invention is applied to printing treatment, the fibers are generally printed with a color paste formed by incorporating the dyestuff, an acid binding agent and urea into a stock paste such as sodium alginate or an emulsion paste. The printed fibers are then either subjected to intermediate drying and subsequent heat treatment or allowed to stand at room or an elevated temperature to fix the dyestuff.

As occasion calls, the fibers immersed beforehand in a solution of an acid binding agent may be printed with a neutral color paste and then allowed to stand at room temperature or subjected to heat treatment.

The fibers thus colored by dip-dyeing, padding or printing treatment are washed with water and, if necessary, hot soaping is carried out by using a solution containing a surfactant.

When dyed with the new disaso compounds of the present invention, there can be obtained navy or black dyeings having excellent fixing rate, build-up and color value. They are good in fastness to light, water and washing, and also have excellent fastness to chlorine water and fastness to light/perspiration. In dip-dyeing a relatively wide range of temperature is available for dyeing from low to high. The disazo compounds have good solubility and so the printing paste and the padding bath are good in dyestuff stability. In printing and continuous dyeing the change in the time of steam heating does not bring about so much fluctuation in dyeing concentration. The staining on white ground is slight.

Among the compounds of formula (1), the compounds of formula (1) wherein X is β-sulfatoethyl, Y is Cl, Z is $Z_1$ and Q is N particularly produce dyeings on cellulosic fibers having good fastness to light/perspiration, to wet and to chlorine water.

The present invention will be illustrated below, but is not limited by the following examples in which parts are by weight.

EXAMPLE 1

7.52 parts of 1,3-diaminobenzene-4-sulfonic acid are dissolved in 70 parts of water at a pH value of 5. 7.5 parts of cyanuric chloride are suspended in 140 parts of ice water containing 0.1 part of a dispersing agent, to the suspension is added dropwise the solution of 1,3-diaminobenzene-4-sulfonic acid while stirring. After completion of the dropping, the mixture is stirred for 30 minutes at 0°–5° C. A solution of sodium carbonate is added gradually to adjust the pH to 6 and the pH value is kept for 1 hour. After completion of the reaction is confirmed, 2.9 parts of sodium nitrite are added and then the mixture is diazotized at 5°–10° C. for 1 hour with addition of 13 parts of hydrochloric acid. Into this diazotized solution is poured a solution of a monoazo dyestuff of the formula:

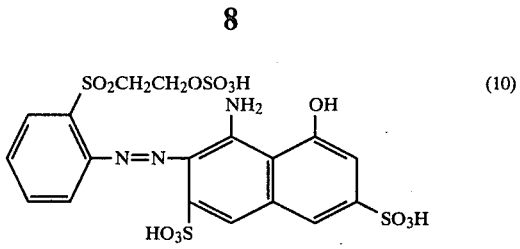

and a solution of sodium carbonate is added to adjust the pH to 6–7, which is kept for 1 hour. After coupling is completed, 4.4 parts of aniline are added, heated up to 40° C. and the pH value is kept at 6–7 with a solution of sodium carbonate. After completion of the reaction is confirmed, salt is added, and the mixture is salted out, filtered and dried to obtain a navy dyestuff (λmax 620 mμ) represented by the formula:

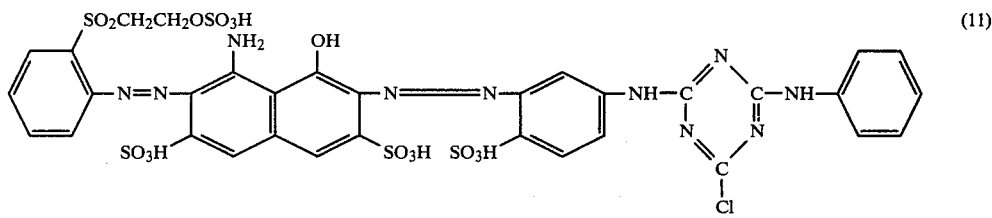

The solution of the monoazo dyestuff represented by formula (10) is obtained as follows: 11.4 parts of aniline-2-β-sulfatoethylsuflone in a solution containing sulfuric acid are mixed with 2.8 parts of sodium nitrite at 5°–10° C. to diazotize, a suspension of 13.6 parts of 1-amino-8-naphthol-3,6-disulfonic acid (H acid) is added thereto and stirred for several hours. Then calcium carbonate is slowly added to neutralize the solution leading to completion of acidic coupling, filtered and calcium sulfate is removed to obtain the desired solution.

EXAMPLES 2-40

In a similar manner to Example 1, there can be obtained those dyestuffs as given in the table below which are represented by the formula:

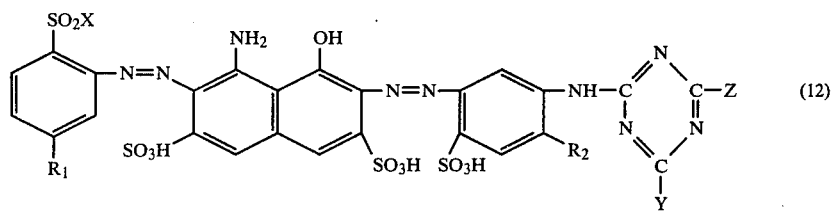

| Example No. | X | $R_1$ | $R_2$ | Y | Z | color shade |
|---|---|---|---|---|---|---|
| 2 | —CH₂CH₂—OSO₃H | H | H | Cl | —NH—⟨3-Cl-phenyl⟩ | navy blue |
| 3 | " | " | " | " | —NH—⟨4-Cl-phenyl⟩ | navy blue |

-continued
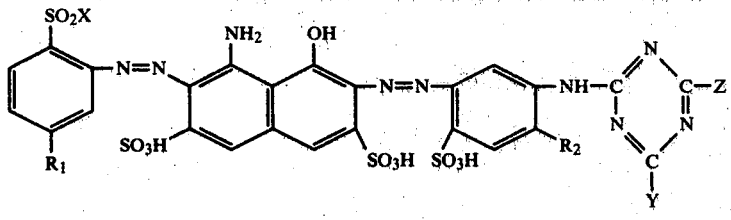
(12)
| Example No. | X | $R_1$ | $R_2$ | Y | Z | color shade |
|---|---|---|---|---|---|---|
| 4 | " | " | " | " | —NH—⟨C₆H₃⟩(CH₃)(Cl) | navy blue |
| 5 | " | " | " | " | —NH—⟨C₆H₄⟩—SO₃H | navy blue |
| 6 | " | " | " | " | —NH—⟨C₆H₄⟩—SO₃H (meta) | navy blue |
| 7 | " | " | " | " | —NH—⟨C₆H₄⟩—SO₃H (ortho) | navy blue |
| 8 | " | " | " | " | —NH—⟨C₆H₄⟩—COOH | navy blue |
| 9 | " | " | " | " | —SCH₂CH₃OH | navy blue |
| 10 | " | " | " | " | —NH—⟨C₆H₃⟩(Cl)(Cl) | navy blue |
| 11 | " | " | " | " | —N(CH₃)—⟨C₆H₅⟩ | navy blue |
| 12 | " | " | " | " | —NH—⟨C₆H₃⟩(SO₃H)(CH₃) | navy blue |
| 13 | " | —Cl | " | " | —NH—⟨C₆H₅⟩ | navy blue |

-continued

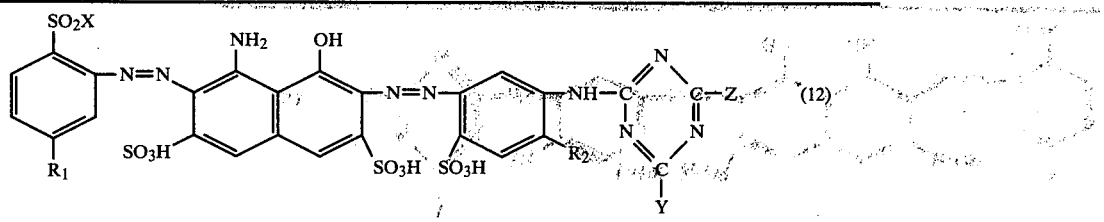

| Example No. | X | R₁ | R₂ | Y | Z | color shade |
|---|---|---|---|---|---|---|
| 14 | " | —SO₃H | " | " | —NH—C₆H₅ | navy blue |
| 15 | " | H | —CH₃ | " | —NH—C₆H₄—Cl (3-) | navy blue |
| 16 | " | " | —SO₃H | " | —NH—C₆H₄—CH₃ (4-) | navy blue |
| 17 | " | " | H | " | —NH—C₆H₄—CH₃ (4-) | navy blue |
| 18 | " | " | " | " | —NH—C₆H₄—Cl (4-) | navy blue |
| 19 | " | " | " | " | —NH—C₆H₃(CH₃)₂ (3,4-) | navy blue |
| 20 | " | " | " | F | —NHCH₂CH₂SO₃H | navy blue |
| 21 | " | " | " | Cl | —NH—C₆H₄—Br (4-) | navy blue |
| 22 | " | " | " | " | —NH—C₆H₄—OCH₃ (4-) | navy blue |
| 23 | " | " | " | " | —N(CH₂CH₂)₂O (morpholino) | navy blue |
| 24 | " | " | " | " | —NH₂ | navy blue |
| 25 | " | " | " | F | —NH.CH₂CH₂OH | navy blue |

-continued

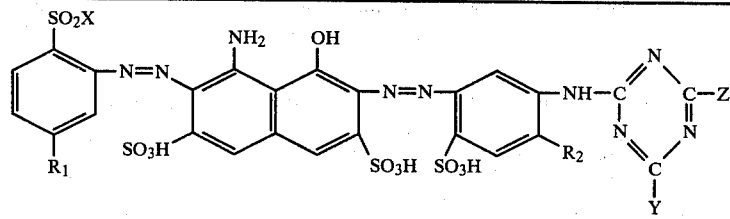
(12)

| Example No. | X | $R_1$ | $R_2$ | Y | Z | color shade |
|---|---|---|---|---|---|---|
| 26 | " | " | " | Cl | $-N(CH_2CH_2OH)_2$ | navy blue |
| 27 | " | " | $-SO_3H$ | " | -N(morpholino)O | navy blue |
| 28 | " | " | H | " | $-NH-C_6H_3(SO_3H)(COOH)$ | navy blue |
| 29 | " | " | " | " | $-OCH_3$ | navy blue |
| 30 | " | " | " | " | $-OCH_2CH_2OC_2H_5$ | navy blue |
| 31 | " | " | " | " | $-O-C_6H_5$ | navy blue |
| 32 | $-CH_2CH_2-OPO_3H_2$ | " | " | " | $-S-C_6H_5$ | navy blue |
| 33 | $-CH_2CH_2-SSO_3H$ | " | " | " | $-NH_2$ | navy blue |
| 34 | $-CH=CH_2$ | " | " | " | $-NH-C_6H_3(SO_3H)(SO_3H)$ | navy blue |
| 35 | $-CH_2CH_2-OPO_3H_2$ | " | " | " | $-NHCH_2COOH$ | navy blue |
| 36 | " | " | " | " | $-NH-C_6H_3(SO_3H)(SO_3H)$ | navy blue |
| 37 | $-CH_2CH_2-SSO_3H$ | " | " | " | $-NHCH_2CH_2SO_3H$ | navy blue |
| 38 | $-CH=CH_2$ | " | " | " | $-NHCH_2CH_2COOH$ | navy blue |

-continued

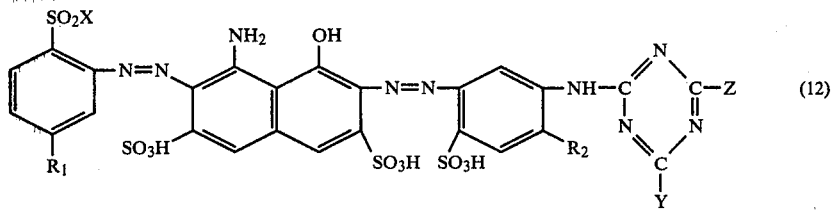

| Example No. | X | R₁ | R₂ | Y | Z | color shade |
|---|---|---|---|---|---|---|
| 39 | —CH₂CH₂—OSO₃H | " | " | " | —NH— (naphthalene-SO₃H) | navy blue |
| 40 | " | " | " | " | —NH— (naphthalene with SO₃H and HO₃S) | navy blue |

EXAMPLE 41

7.5 parts of cyanuric chloride are suspended in 140 parts of ice water containing 0.1 part of a dispersing agent, to this suspension is added a neutral solution of 11.0 parts of aniline-2,5-disulfonic acid in 60 parts of water while stirring and the pH value is kept at 5–6 for 2 hours with a solution of sodium carbonate. After completion of the reaction is confirmed, a solution of 7.52 parts of 1,3-diaminobenzene-4-sulfonic acid in 70 parts of water at pH 5 is added dropwise to the mixture at room temperature, stirred for 30 minutes and then heated to 40° C., a solution of sodium carbonate is added to adjust the pH to 6 and the solution is kept at 40° C. and at pH 6 for 2 hours.

After completion of the reaction is confirmed, the solution is cooled, 2.9 parts of sodium nitrite is added, 22 parts of hydrochloric acid are added at 5°–10° C. to diazotize for 1 hour. Into this diazotized solution there is poured a monoazo solution of formula (10) described in Example 1, and the pH value is kept at 6–7 for 2 hours by addition of a solution of sodium carbonate. Then the solution is heated to 40° C., salted out, filtered and dried to obtain a navy dyestuff (λmax 620 mμ) represented by the formula:

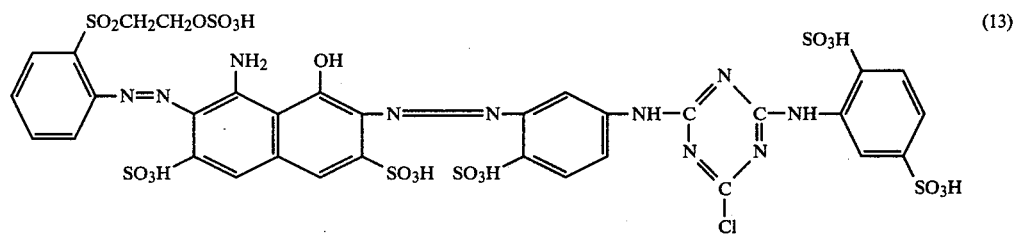

In a similar manner to Example 41, there can be obtained those dyestuffs as given in the table mentioned above (Examples 2–40).

EXAMPLE 42

Condensing 7.52 parts of 1,4-diaminobenzene-6-sulfonic acid with 8.9 parts of 2,4,5,6-tetrachloropyrimidine, there is synthesized 1-amino-4-(2',5',6'-trichloropyrimidyl-4'-amino) benzene-6-sulfonic acid. To its neutral solution are added 2.9 parts of sodium nitrite, further added 13 parts of hydrochloric acid at 5°–10° C. and diazotized for 1 hour. To this diazotized solution there is added a monoazo solution of formula (10) described in Example 1, further added a solution of sodium carbonate to keep the pH at 5–6 for 2 hours. After heating up to 50° C., the solution is salted out, filtered and dried to obtain a greenish navy dyestuff (λmax 610 mμ) represented by the formula:

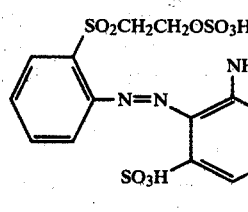

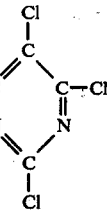

(14)

In this Example, there can be used 2,4,6-trifluoro-5-chloro-pyrimidine instead of 2,4,5,6-tetrachloropyrimidine to obtain a dyestuff having a similar shade.

EXAMPLE 43

In Example 1 instead of the compound of formula (10) the compound of the formula:

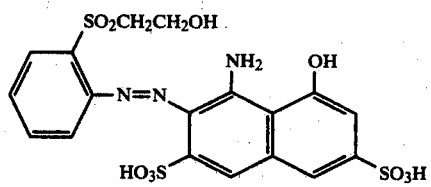

(15)

is used to obtain the compound of the formula:

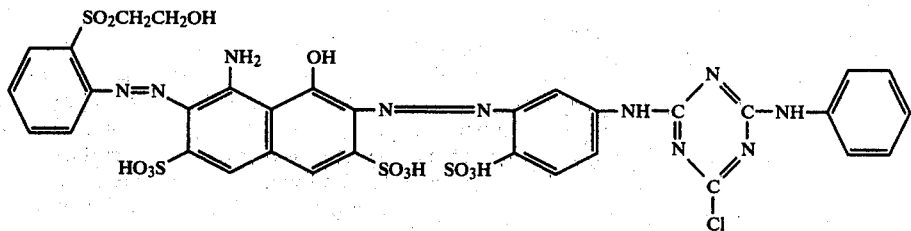

(16)

20 parts of the compound of formula (16) are added to 50 g of 96% sulfuric acid at 30° C. The mixture is stirred for 3 hours to esterify the compound. After it is poured into 100 parts of ice water it is neutralized to pH 5-6 with aqueous NaOH or NaHCO3, salted out, filtered and dried to obtain the compound of formula (11) which is the same as obtained in Example 1. In a similar manner to this example there can be obtained those dyestuffs as given in the table mentioned above (Examples 2-40).

EXAMPLE 44

The compound of the formula:

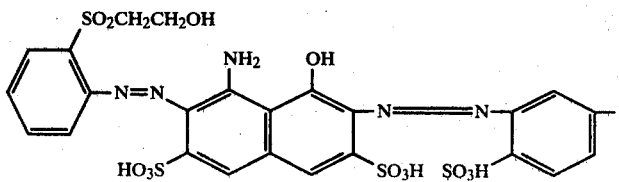

(17)

is obtained using the compound of formula (15) instead of the compound of formula (10) in Example 41 in a similar way 22.4 parts of the compound of formula (17) are added to 60 parts of pyridine. After heating up to 80° C. 6 parts of sulphamic acid are added thereto. The mixture is stirred at 100°-105° C. for 1.5 hours and after distilling out the pyridine under a reduced pressure the mixture is neutralized to pH 5-6, salted out, filtered and dried to obtain the compound of formula (13) as obtained in Example 41. In a similar manner to this example there can be obtained those dyestuffs as given in the table mentioned above.

EXAMPLE 45

In a dye bath prepared with 3 parts of the dyestuff of formula (11), 80 parts of sodium sulfate anhydride and 1000 parts of water there are immersed 50 parts of cotton knit goods to treat at 80° C. for 30 minutes and 20 parts of sodium carbonate is added, followed by dyeing at said temperature for 60 minutes. Then the dyeing is washed with water, soaping is carried out at 95°-100° C. for 10 minutes by using 1000 parts of an aqueous solution containing 2 parts of an anion active agent, then washed with water and dried to obtain a dark navy dyeing excellent in fastness to light/perspiration, to chlorine water and to wet.

EXAMPLE 46

In a dye bath prepared with 3 parts of the dyestuff of Example 2, 40 parts of sodium sulfate anhydrous and 1000 parts of water there are immersed 50 parts of spun rayon yarn to treat at 80° C. for 30 minutes and 20 parts of sodium carbonate is added, followed by dyeing at said temperature for 60 minutes. Then the dyeing is treated in the same manner as Example 45 to obtain a deep navy dyeing excellent in fastness to light/perspiration, to chlorine water and to wet.

EXAMPLE 47

The following color paste was prepared with the dyestuff of formula (13).

| Dyestuff | X parts | sodium bicarbonate | 20 parts |
|---|---|---|---|
| 5% sodium alginate | 500 parts | reduction inhibitor | 10 parts |
| Urea | 1000 parts | water | 370-X parts |

[X is 10, 30 or 80. Polymin L new (made by Nippon Kayaku) was used as the reduction inhibitor.]

Mercerized cotton satin was printed with said color paste, dried at 60° C. for 10 to 30 minutes, subjected to steaming for 10 minutes in saturated steam at 100° C. and washed with running water. Then the dyeing was subjected to soaping at 100° C. for 10 minutes in a soaping bath containing an anion active agent at the rate of 1 g per liter, followed by washing with water and drying, to obtain a navy dyeing good in wet fastness and build up. Even if the time of steaming is changed to periods such as 2.5 min., 5 min., 10 min. or 20 min., fluctuation in concentration of dyeing is slight.

EXAMPLE 48

1000 parts of color paste were prepared with 60 parts of dyestuff of Example 24, 500 parts of 5% sodium alginate, 100 parts of urea, 10 parts of a reduction inhibitor, 20 parts of sodium carbonate and 310 parts of water. This color paste was printed on mercerized cotton satin, dried at 60° C. and subjected to baking at 150° C. for 3 minutes. The dyeing was washed with water, subjected to soaping at 100° C. for 10 minutes in a soaping bath containing an anion active agent, then washed with water and dried.

The dyed cloth is excellent in different kinds of fastness, especially in wet fastness.

EXAMPLE 49

The following padding bath was prepared.

| Azo compound of formula (9) | X parts | Urea | 50 (X = 10) parts |
|---|---|---|---|
| | | | 100 (X = 30) parts |
| | | | 150 (X = 60) parts |
| Sodium alginate | 1 part | sodium carbonate | 20 parts |
| Reduction inhibitor | 2 parts | water | 767 (X = 60) parts |
| | | | 847 (X = 30) parts |
| | | | 917 (X = 10) parts |

[X is 10, 30 or 60. Polymin L new (made by Nippon Kayaku) was used as a reduction inhibitor.]

A non-mercerized cotton broad was padded in the above bath, squeezed with a mangle to a squeezing rate of 60%, dried at 100° C. for 2 minutes and subjected to baking at 150° C. for 3 minutes.

Then the cloth was washed with running water, subjected to soaping at 100° C. for 10 minutes in a soaping bath containing an anion active agent at the rate of 1 g per liter, washed again with running water and dried.

In any case where X is 10, 30 or 60, there were obtained navy dyeing excellent in fastness to light, chlorine water, washing and wet.

EXAMPLE 50

1000 parts of padding bath were prepared with 30 parts of the dyestuff of Example 5, 100 parts of urea, 20 parts of sodium carbonate, 1 part of sodium alginate, 5 parts of a reduction inhibitor and 844 parts of water.

Spun rayon was padded in the above bath, squeezed to squeezing rate of 60% and subjected to steaming for 7 minutes in saturated steam at 100° C. Then the cloth was washed with water, subjected to soaping and washed again and dried to obtain navy dyeing excellent in wet fastness.

What is claimed is:

1. A reactive disazo compound which, in the free acid form, is represented by the formula:

$$\text{(1)}$$

wherein $R_1$ is H, Cl or $SO_3H$, $R_2$ is H, $CH_3$ or $SO_3H$, X is β-sulfatoethyl, β-thiosulfatoethyl, β-phosphatoethyl or vinyl, Y is Cl or F, Z is Cl, F or $Z_1$, $Z_1$ is amino; mono- or dialkylamino having 1 to 4 carbon atoms which may be substituted by hydroxy, carboxy or sulfo; morpholino; anilino which may be substituted by halogen, lower alkyl, lower alkoxy, carboxy or sulfo; N-methylanilino, naphthylamino or sulfo substituted naphthylamino; alkoxy having 1 to 4 carbon atoms which may be substituted by lower alkoxy; phenoxy; alkylthio having 1 to 4 carbon atoms which may be substituted by hydroxy; phenylthio, and Q is N, C—Cl or C—F when Z is Cl or F and N when Z is $Z_1$.

2. The compound of claim 1 wherein X is β-sulfatoethyl, Y is Cl, Z is $Z_1$ and Q is N.

3. The compound of claim 2 wherein $R_1$ is H, $R_2$ is H, and $Z_1$ is m-chloroanilino.

4. The compound of claim 2 wherein $R_1$ is H, $R_2$ is H, and $Z_1$ is p-chloroanilino.

5. The compound of claim 2 wherein $R_1$ is H, $R_2$ is H, and $Z_1$ is 3-chloro-4-methylanilino.

6. The compound of claim 2 wherein $R_1$ is H, $R_2$ is H, and $Z_1$ is 3,4-dichloroanilino.

7. The compound of claim 2 wherein $R_1$ is H, $R_2$ is H and $Z_1$ is p-toluidino.

8. The compound of claim 2 wherein $R_1$ is H, $R_2$ is H and $Z_1$ is 3,4-dimethylanilino.

* * * * *

UNITED STATES PATENT AND TRADEMARK OFFICE
CERTIFICATE OF CORRECTION

PATENT NO. : 4,425,270

DATED : January 10, 1984

INVENTOR(S) : Yasushi Yamada, et al.

It is certified that error appears in the above-identified patent and that said Letters Patent is hereby corrected as shown below:

On the Title Page, the following item [30] should be inserted between item [22] and item [51]:

--[30] Foreign Application Priority Data

April 4, 1980 [JP] Japan ..................55-46188--

*Signed and Sealed this*

*Fifteenth* Day of *January 1985*

[SEAL]

*Attest:*

GERALD J. MOSSINGHOFF

*Attesting Officer*     *Commissioner of Patents and Trademarks*